(12) United States Patent
Capoldi

(10) Patent No.: US 9,810,266 B2
(45) Date of Patent: Nov. 7, 2017

(54) BEARING WITH PROTECTIVE COVER FOR A SEAL

(71) Applicant: Bruno Capoldi, Charentenay (FR)

(72) Inventor: Bruno Capoldi, Charentenay (FR)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 15/065,011

(22) Filed: Mar. 9, 2016

(65) Prior Publication Data

US 2016/0265594 A1    Sep. 15, 2016

(30) Foreign Application Priority Data

Mar. 12, 2015  (FR) .................................... 15 52056

(51) Int. Cl.
| F16C 33/78 | (2006.01) |
| F16C 19/38 | (2006.01) |
| F16C 33/76 | (2006.01) |
| F16C 33/80 | (2006.01) |
| F16C 19/50 | (2006.01) |
| F16C 33/74 | (2006.01) |

(52) U.S. Cl.
CPC ........ *F16C 33/7886* (2013.01); *F16C 19/381* (2013.01); *F16C 19/505* (2013.01); *F16C 33/76* (2013.01); *F16C 33/783* (2013.01); *F16C 33/7896* (2013.01); *F16C 33/805* (2013.01); *F16C 33/74* (2013.01); *F16C 2300/14* (2013.01)

(58) Field of Classification Search
CPC ..... F16C 33/805; F16C 33/78–33/7896; F16C 19/381; F16C 19/505; F16C 2300/14; F16C 33/74; F16C 33/76; F16J 15/3463; F16J 15/3468–15/3488
See application file for complete search history.

(56) References Cited

U.S. PATENT DOCUMENTS

| 5,833,372 A * | 11/1998 | Nisley ..................... F16C 33/76 |
| | | 277/348 |
| 8,535,009 B2 * | 9/2013 | Hofmann .............. F16C 19/386 |
| | | 290/44 |

FOREIGN PATENT DOCUMENTS

| EP | 0889254 A2 | 1/1999 |
| EP | 1277978 A1 | 1/2003 |
| EP | 2375092 A1 | 10/2011 |
| EP | 2455630 A2 | 5/2012 |

* cited by examiner

*Primary Examiner* — Alan B Waits
(74) *Attorney, Agent, or Firm* — Bryan Peckjian; SKF USA Inc. Patent Dept.

(57) ABSTRACT

A bearing having an inner ring, an outer ring, and at least one seal arranged between the rings. The bearing including a protective cover that delimits an annular space into which the seal extends and provides an outer annular portion and at least one inner portion disposed radially facing and at a distance from one another, and a connecting annular portion linking the outer annular portion and the inner portion; and at least one means for fixing the protective cover onto the inner ring, the fixing means passing through the outer and inner portions of the protective cover and cooperating with the inner ring.

19 Claims, 3 Drawing Sheets

BEARING WITH PROTECTIVE COVER FOR A SEAL

CROSS REFERENCE TO RELATED APPLICATION

This is a Non-Provisional Patent Application, filed under the Paris Convention, claiming the benefit of French (FR) Patent Application Number 1552056, filed on 12 Mar. 2015, which is incorporated herein by reference in its entirety.

TECHNICAL FIELD OF THE INVENTION

More particularly, the invention relates to the field of large diameter rolling bearings, having to withstand heavy axial and radial loads, used notably in aggressive environments, for example in mining extraction machines to form orientation bearings.

BACKGROUND OF THE INVENTION

Generally, the space in which the row or rows of rolling elements are located is protected from the outside by an outer annular seal arranged between the rings.

To further improve this seal-tightness and increase the life of the annular seal, it has already been proposed to provide an annular protective cover on top of the seal, generally of L-shaped section, the radial branch of which has an inner portion inserted into a peripheral groove of the inner ring of the bearing. This cover is fixed using pins which are inserted into inclined holes formed in the inner ring of the bearing, from points outside the cover, and which pass though this inner portion.

This arrangement is axially bulky and is complicated to implement. Furthermore, it presents a difficulty associated with the accessibility of the pins in view of the surrounding parts of the machine, if it presents a need to dismantle the cover for a cleaning or seal change service, for example, and to reassemble the cover.

SUMMARY OF THE INVENTION

The present invention aims in particular to remedy these drawbacks.

According to one embodiment, a bearing is proposed which comprises an inner ring, an outer ring, and at least one seal arranged between said rings.

The bearing comprises a protective cover which delimits an annular space into which said seal extends and which comprises an outer annular portion and at least one inner portion situated radially facing and at a distance from one another, and a connecting annular portion linking said outer annular portion and said inner portion. The bearing further comprises at least one means for fixing the cover onto the inner ring, this fixing means passing through said outer and inner portions of said protective cover and cooperating with the inner ring.

Thus, the fitting and the removal of the protective cover and of the fixing means are simplified.

According to a preferred variant embodiment, said fixing means may extend radially.

Said fixing means may advantageously extend through said annular space.

Said fixing means may comprise a screw whose head bears on an outer surface of the outer annular portion of the protective cover.

Said inner portion may be arranged so as to be adjacent to a peripheral surface of the inner ring.

According to a variant embodiment, the cover may comprise a plurality of local inner portions secured to the connecting portion. The bearing may comprise a plurality of fixing means passing respectively through-orifices of the outer portion and of these inner portions and cooperating with the inner ring.

According to another variant embodiment, said inner portion of the protective cover may be annular.

The connecting portion of the protective cover may comprise an annular inner part inserted into a peripheral annular groove of the inner ring.

The outer portion and the connecting portion of the protective cover may be of L-shaped section.

The bearing may further comprise an annular axial partition extending into said annular space between said outer portion of said cover and said seal and mounted on the outer ring.

BRIEF DESCRIPTION OF THE DRAWINGS

Bearings according to the present invention will now be described by way of non-limiting examples, illustrated by the drawing in which.

DETAILED DESCRIPTION OF SOME EMBODIMENTS

Figure 1:
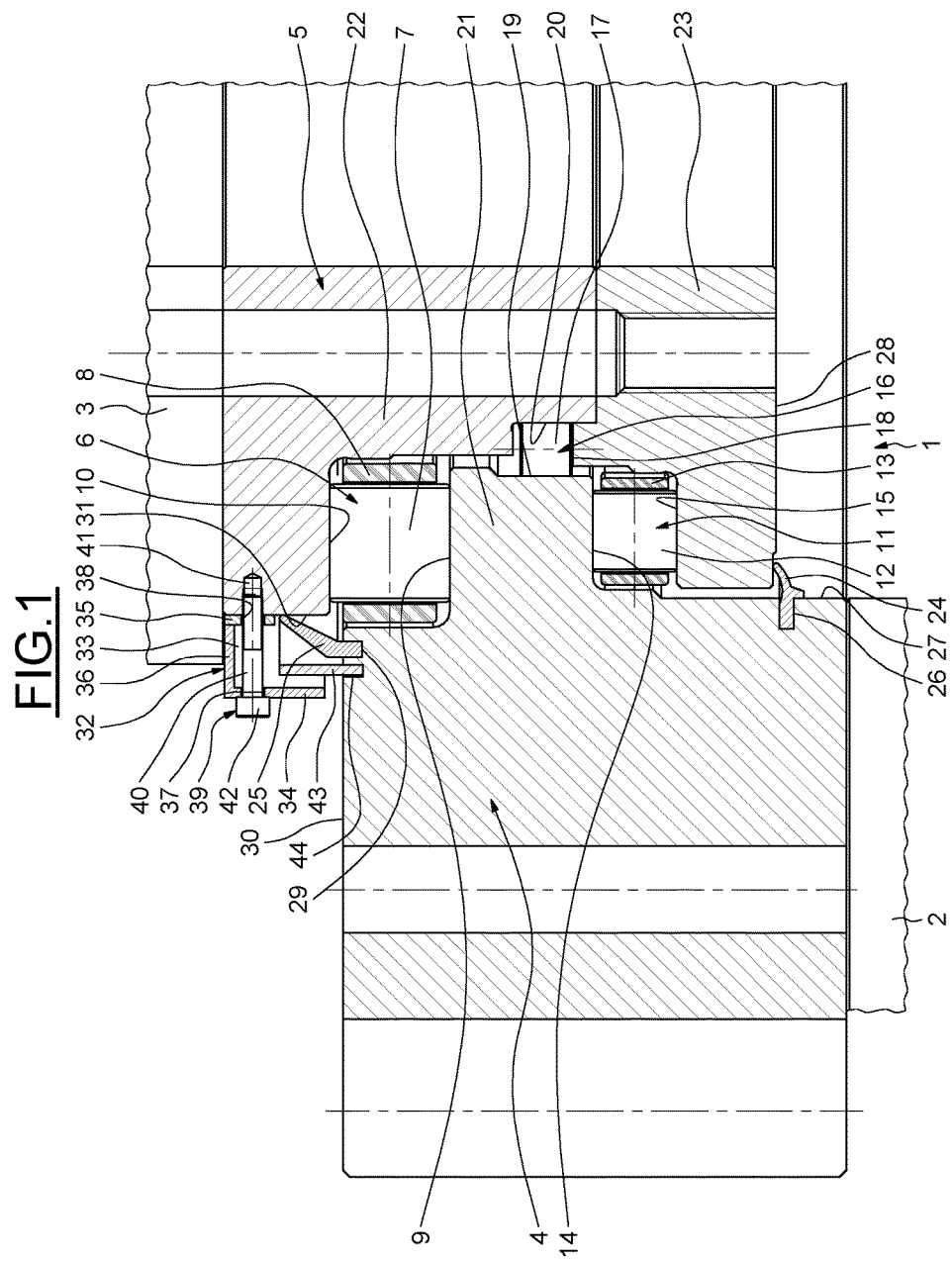
FIG. 1 represents a half-view in axial cross section of a rolling bearing equipped with a protective cover.

As illustrated in FIG. 1, a rolling bearing 1 is installed between a frame 2 and on a frame 3 in order to allow a rotation of one relative to the other according to an axis of rotation (not represented) and transmit the loads between them. In the following description, this axis of rotation will be considered in a vertical position.

The rolling bearing 1 comprises an outer ring 4 mounted on the frame 2 and an inner ring 5 mounted on the frame 3, arranged concentrically.

To withstand the axial loads, the rolling bearing 1 comprises, for example, an upper row 6 of rolling elements 7, such as rollers, held in position by a cage 8 and rolling on axial annular tracks 9 and 10 respectively of the outer ring 4 and of the inner ring 5, as well as a lower row 11 of rolling elements 12, such as rollers, held in position by a cage 13 and rolling on axial annular tracks 14 and 15 respectively of the outer ring 4 and of the inner ring 5.

To withstand the radial loads, the rolling bearing 1 comprises, for example, an intermediate row 16 of rolling elements 17, such as rollers, held in position with or without cage 18 and rolling on cylindrical tracks 19 and 20 respectively of the outer ring 4 and of the inner ring 5.

In the exemplary embodiment illustrated, the outer ring 4 comprises a protruding inner annular portion 21 which has, on either side, the tracks 9 and 14 and which has, on its inner face, the track 19. The inner ring 5 is axially in two parts 22 and 23 linked together for example by bolts (not represented) and respectively having the tracks 10 and 15.

To ensure the seal-tightness of the annular space between the rings 4 and 5 in which the rows of rolling elements 7, 11 and 16 are situated, the rolling bearing 1 comprises a bottom annular seal 24 adjacent to a bottom annular end of this inter-ring space and a top annular seal 25 which is adjacent to a top annular end of this inter-ring space.

The bottom seal 24 has, for example, a portion inserted into an annular groove 26 formed radially in an inner cylindrical face 27 of the outer ring 4 and has an annular lip in contact on a bottom radial face 28 of the inner ring 5.

The top seal 25 has, for example, a portion inserted into an annular groove 29 formed axially in a top axial annular face 30 of the outer ring 4 and has an annular contact lip, in contact on a peripheral radial annular surface 31, for example cylindrical, of the inner ring 5.

The rolling bearing 1 further comprises a protective cover 32 which delimits a protected annular space 33, wedge-shaped, which is adjacent to the axial face 30 of the outer ring 4 and to the cylindrical face 31 of the inner ring 5 and into which the top seal 25 extends, the protective cover 32 being at a distance from the seal 25 and fixed to the inner ring 5.

Figure 2:
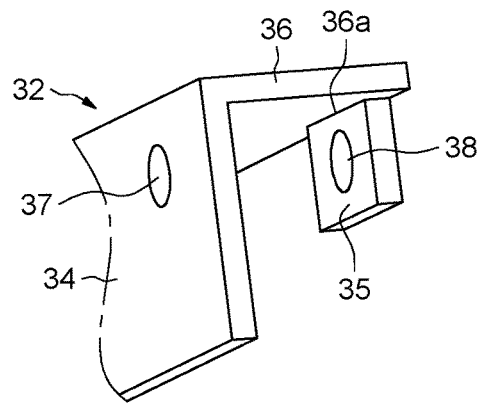
FIG. 2 represents a partial view in perspective of the protective cover of FIG. 1.

According to the exemplary embodiment illustrated in FIGS. 1 and 2, the protective cover 32 comprises an outer annular portion 34, a plurality of local inner portions 35 situated radially facing and at a distance from one another and a connecting annular portion 36 linking the outer annular portion 34 and the local inner portions 35.

The outer portion 34 and the connecting portion 36 form, in section, an L, for example of a single piece obtained by bending.

The outer portion 34 is cylindrical and extends axially from the outer annular end of the connecting portion 36 to near the radial face 30 of the outer ring 4, leaving a space remaining between its free axial annular end and this radial face 30.

The connecting portion 36 extends radially from the outer portion 34 to the cylindrical face 31 of the inner ring 5, coming into contact therewith, at a distance from the contact lip of the seal 25.

The local inner portions 35 are fixed to the connecting portion 36, for example by welding, and extend towards the axial face 30 of the outer ring 4, by being in contact with the cylindrical face 31 of the inner ring 5 and between the connecting portion 36 and the contact lip of the seal 25, such that a space remains between the free end of the local inner portions 35 and the seal 25.

For example, the local inner portions 35 are distributed peripherally and respectively have parts inserted into internal notches 36a of the connecting radial portion 36.

The outer portion 34 and the local inner portions 35 respectively have through-orifices 37 and 38 situated radially facing one another.

The protective cover 32 is fixed to the inner ring 5 using a plurality of fixing means consisting of fixing screws 39 arranged radially, the stems 40 of which pass respectively through the through-orifices 37 and 38 of the outer portion 34 and of the local inner portions 35 and are screwed into radial tapped holes 41 of the inner ring 5 and whose heads 42 bear on the outer face of the outer portion 34. Thus, the stems 40 of the screws 39 pass through the space 33 delimited by the protective cover 32 and extend to near the connecting radial annular portion 36. Preferably, the diameter of the through-orifices 37 and 38 is slightly greater than the diameter of the stems 40 of the fixing screws 39.

The radial positioning of the fixing screws 39 makes them easier to fit and remove, even if the frame 3 extends over the connection portion 36 of the protective cover 32. Furthermore, the orifices 38 of the inner local portions 35, adjacent to the inner ring 5, facilitate the fitting of the fixing screws 39 and at the same time the axial positioning of the protective cover 32.

The protected annular space 33 delimited by the protective cover 32 is axially closed and radially open only by the functional space between the free end of the outer portion 34 and the axial face 30 of the outer ring. Furthermore, the protected annular space 33 can receive a lubricating grease.

Furthermore, a protective cylindrical annular partition 43 is provided which has an end inserted into a frontal annular groove 44 of the outer ring 4 and which extends into the annular space 33, between and at a distance from the seal 25 and the outer portion 36 of the protective cover 32, without reaching the stems 40 of the fixing screws 39.

The protective partition 43 extends axially such that it extends radially facing the space between the outer portion 34 of the protective cover 32 and the radial face 30 of the outer ring 4 and that it has an end annular part radially facing the outer portion 34 of the protective cover 32. Thus, the protective partition 43 constitutes a local obstacle slowing down the penetration of a liquid towards the seal 25.

Figure 3:
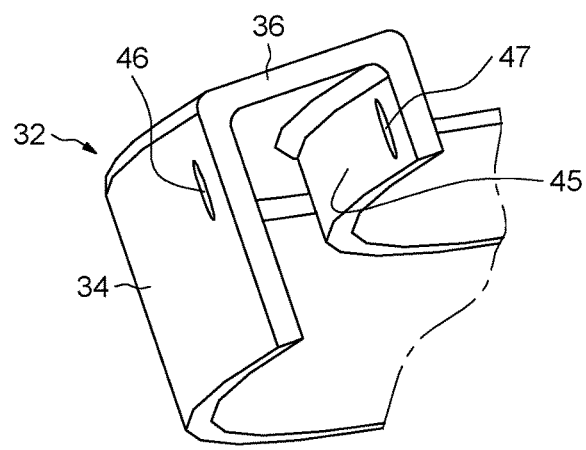
FIG. 3 represents a partial view in perspective of a variant embodiment of the protective cover.

According to a variant embodiment illustrated in FIG. 3, the protective cover 32 may comprise, instead of the plurality of inner local portions 35 of the preceding example, a continuous cylindrical inner annular portion 45 encircling the cylindrical surface 31 of the inner ring 5, by being in contact therewith.

In this case, the protective cover 32 may for example be of a single piece, of U-shaped section, the cylindrical outer annular portion 34, the connecting radial annular portion 36 and this cylindrical inner annular portion 45 being able to be obtained by bending.

In a manner equivalent to the preceding example, the outer cylindrical annular portion 34 and this inner cylindrical annular portion 45 respectively comprise pluralities of through-orifices 46 and 47 radially aligned for the passage of fixing screws 39.

Figure 4:
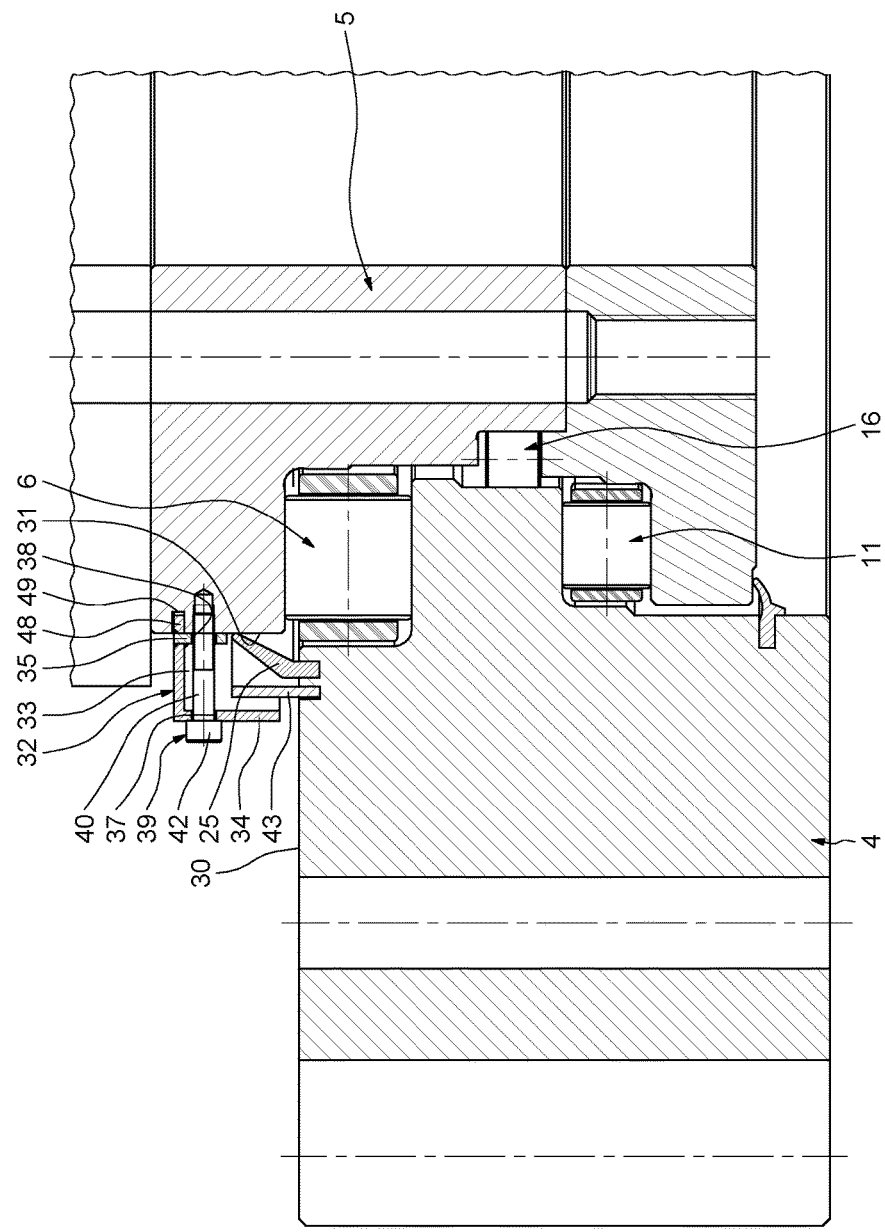
FIG. 4 represents the rolling bearing equipped with a variant embodiment of the protective cover.

According to a variant embodiment illustrated in FIG. 4, the connecting radial annular portion 36 of the protective cover 32 described with reference to FIGS. 1 and 2 may comprise an extension inner annular part 48, inserted into a peripheral annular groove 49 formed in the cylindrical face 31 of the inner ring. Thus, the axial positioning of the protective cover 32 is facilitated. In this case, the protective cover 32 would comprise a number of segments joined together in order to allow the introduction of the extension inner annular part 48 into the peripheral groove 49.

In the above description, the rolling bearing comprises three rows of rolling elements. Nevertheless, the present invention can be applied to a rolling bearing comprising at least one row of rolling elements. The invention may also apply to a bearing without rolling elements interposed between the rings, as for a plain bearing or a ball joint for example. Moreover, the seal protected by the protective cover could be arranged differently and possibly cooperate with the protective cover. A number of seals could be provided.

The invention claimed is:

1. A bearing comprising:
an outer ring,
an inner ring, and
at least one seal arranged between the rings,
wherein a protective cover includes an outer annular portion disposed radially facing an at least one inner portion, the outer annular portion and the at least one inner portion arranged at a distance from one another, and a connecting annular portion extending between and linking the outer annular portion and the inner portion, the outer annular portion, the at least one inner portion, the connecting annular portion, and a portion of the inner ring facing the outer annular portion collectively delimiting an annular space into which at least a part of the seal extends; and at least one fixing element for fixing the protective cover onto the inner ring, wherein the at least one fixing element passing through the outer portion, the inner portion, and the annular space of the protective cover and cooperating with the inner ring.

2. The bearing according to claim 1, wherein the fixing element extends radially.

3. The bearing according to claim 1, wherein the seal is independent of the protective cover.

4. The bearing according to claim 1, wherein the fixing element provides a screw whose head bears on an outer surface of the outer annular portion of the protective cover.

5. The bearing according to claim 1, wherein the inner portion is adjacent to a peripheral surface of the inner ring.

6. A bearing according to claim 1, wherein the protective cover provides a plurality of local inner portions secured to the connecting portion, the bearing including a plurality of fixing elements passing respectively through-orifices of the outer portion and of local inner portions and cooperating with the inner ring.

7. The bearing according to claim 1, wherein the inner portion is annular.

8. The bearing according to claim 1, wherein the connecting portion of the protective cover provides an annular inner part that is inserted into a peripheral annular groove of the inner ring.

9. The bearing according to claim 1, wherein the outer portion and the connecting portion of the protective cover are an L-shaped section.

10. The bearing according to claim 1, further comprising an annular axial partition extending into said annular space between the outer portion of the protective cover and the seal and mounted on the outer ring.

11. A bearing comprising:
an outer ring,
an inner ring,
at least one seal arranged between the rings,
wherein a protective cover delimits an annular space into which at least a part of the seal extends, and provides an outer annular portion and at least one inner portion disposed radially facing and at a distance from one another, and a connecting annular portion linking the outer annular portion and the inner portion;
at least one means for fixing the cover onto the inner ring, the fixing element passing through the outer and inner portions of the protective cover and cooperating with the inner ring; and
an annular axial partition extending into said annular space between the outer portion of the protective cover and the seal and mounted on the outer ring.

12. The bearing according to claim 11, wherein the fixing element extends radially.

13. The bearing according to claim 11, wherein the seal is independent of the protective cover.

14. The bearing according to claim 11, wherein the fixing element provides a screw whose head bears on an outer surface of the outer annular portion of the protective cover.

15. The bearing according to claim 11, wherein the inner portion is adjacent to a peripheral surface of the inner ring.

16. A bearing according to claim 11, wherein the protective cover provides a plurality of local inner portions secured to the connecting portion, the bearing including a plurality of fixing elements passing respectively through-orifices of the outer portion and of local inner portions and cooperating with the inner ring.

17. The bearing according to claim 11, wherein the inner portion is annular.

18. The bearing according to claim 11, wherein the connecting portion of the protective cover provides an annular inner part that is inserted into a peripheral annular groove of the inner ring.

19. The bearing according to claim 11, wherein the outer portion and the connecting portion of the protective cover are an L-shaped section.

* * * * *